United States Patent [19]

Takahashi et al.

[11] Patent Number: 4,480,366
[45] Date of Patent: Nov. 6, 1984

[54] VERTICAL MILLING AND TURNING MACHINES

[75] Inventors: Katsuji Takahashi, Mishima; Shigeharu Fujii, Numazu; Makoto Sagara, Mishima, all of Japan

[73] Assignee: Toshiba Kikai Kabushiki Kaisha, Tokyo, Japan

[21] Appl. No.: 450,752

[22] Filed: Dec. 17, 1982

[30] Foreign Application Priority Data

Dec. 21, 1981 [JP] Japan .................... 56-206385

[51] Int. Cl.³ .................... B23C 5/26; B23Q 15/00
[52] U.S. Cl. .................... 29/26 A; 409/233
[58] Field of Search .......... 29/26 A, 568; 409/233, 409/234, 232; 408/241 R

[56] References Cited

U.S. PATENT DOCUMENTS 3,477,121 11/1969 Martin .................... 29/568
3,603,203 9/1971 Rhodes .................... 409/232

Primary Examiner—Z. R. Bilinsky
Attorney, Agent, or Firm—Koda and Androlia

[57] ABSTRACT

A vertical milling and turning machine generally comprises a spindle assembly connected to a drive motor. The spindle assembly comprises a hollow ram provided with a tapered opening at the front end thereof for attaching a turning tool and a hollow spindle provided with a tapered opening coaxial with the former opening at the front end of the spindle and the tapered opening of the spindle has a diameter smaller than that of the later opening. An air supply passage is formed in the ram so as to have an end opening opened towards the tapered opening of the ram and a detecting switch for detecting a pressure in the passage is connected to the air supply passage.

1 Claim, 4 Drawing Figures

VERTICAL MILLING AND TURNING MACHINES

BACKGROUND OF THE INVENTION

This invention relates to an improved vertical lathe capable of carrying out milling and turning operation to a workpiece.

A vertical lathe for carrying out milling and turning operations comprises a spindle assembly including a hollow ram having a front end portion provided with an inner tapered surface and a hollow spindle journaled by a bearing in the hollow portion of the ram and provided with a front end portion having an inner tapered surface. A turning tool is secured to the front end of the ram when it is operated and a milling tool is secured to the front end of the spindle when operated. The tapered hole of the ram for the turning tool has a diameter larger than that of the spindle for the milling tool. At the attachment of these tools, both tools are inserted into the hollow portion of the ram and pulled upwardly into the hollow portion of the spindle to secure them to the spindle assembly.

With the vertical milling and turning machine of the type described above, at the milling operation, a first shank portion having small diameter of the milling tool engages the tapered portion of the spindle and a second shank portion having large diameter is spaced from the tapered portion of the ram, and on the other hand, at the turning operation, a first shank portion having small diameter of the turning tool is spaced from the tapered portion of the spindle and a second shank portion having large diameter engages the tapered portion of the ram. Thus, during the milling operation, dusts and swarves are likely intruded into a gap between the second shank portion of the milling tool and the tapered surface at the inner front end of the ram. In addition, during the turning operation, since the turning tool is secured to the ram by a key member, for example, if the spindle is erroneously rotated, the spindle assembly and the tool will be damaged.

SUMMARY OF THE INVENTION

An object of this invention is to provide an improved vertical milling and turning machine so as to prevent intrusion of dusts or the like in milling operation into a gap between a milling tool and a ram by feeding compressed air into the gap.

Another object of this invention is to provide an improved vertical milling and turning machine having a switching circuit which operates in response to a detected compressed air pressure so as to prevent an erroneous rotation of the spindle during the turning operation.

According to this invention, there is provided a vertical milling and turning machine generally comprising a spindle assembly connected to a drive motor, the spindle assembly comprising a hollow ram provided with a tapered opening at the front end thereof for attaching a turning tool and a hollow spindle provided with a tapered opening coaxial with the former opening at the front end thereof, the tapered opening of the spindle having a diameter smaller than that of the later opening, and an air supply passage is formed in the ram so as to have an end opening opened to the tapered opening of the ram, to the air supply passage being connected to a compressed air source and to a switch device for detecting pressure in the passage.

DESCRIPTION OF THE PREFERRED EMBODIMENTS

Figure 1:
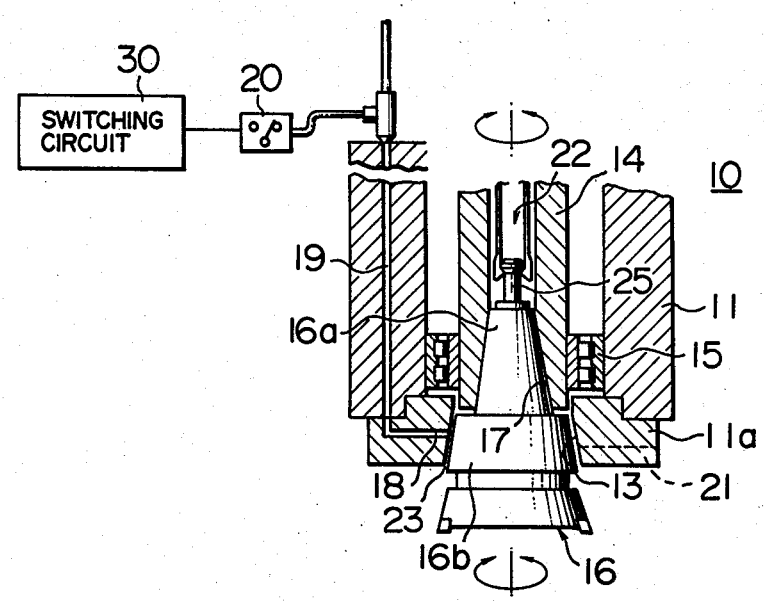
FIG. 1 shows a partial sectional view of a vertical milling and turning machine according to this invention during milling operation.
Figure 2:
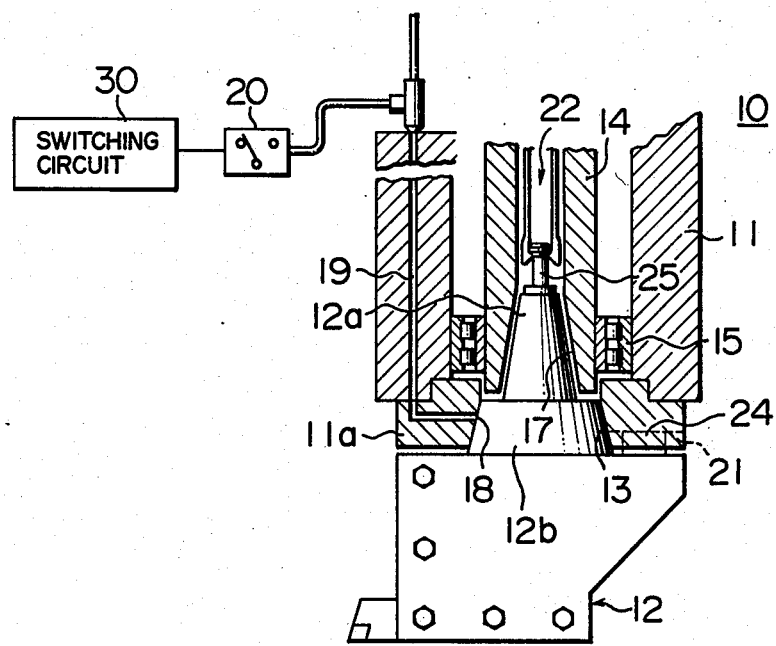
FIG. 2 shows a sectional view similar to FIG. 1 during turning operation.

Referring to FIGS. 1 and 2, a spindle assembly 10 of a vertical milling and turning machine of this invention comprises a hollow ram 11 having a front end portion 11a provided with an inner tapered surface forming a tapered hole 13 for engaging and attaching a turning tool 12 and a hollow spindle 14 located within the hollow portion of the ram 11 and rotatably supported by a bearing 15. A small tapered hole 17 is provided for the front end portion of the spindle to be coaxial with the tapered hole 13 of the ram 11 and a milling tool is engaged with and secured to the tapered hole 17.

A compressed air supply passage 19 is formed in the ram 11 and opened to the tapered hole at the portion 18. The air supply passage 19 is connected to an externally compressed air supply source, not shown; and a pressure detecting switch 20 is connected on the way of the supply passage 19 for detecting pressure in the supply passage 19 and generating an electric signal in response to the detected pressure.

A key groove 21 to be engaged with a key member 24 of the turning tool 12 is formed at the end of the ram 11 to secure the tool 12 when operated.

Figure 3:
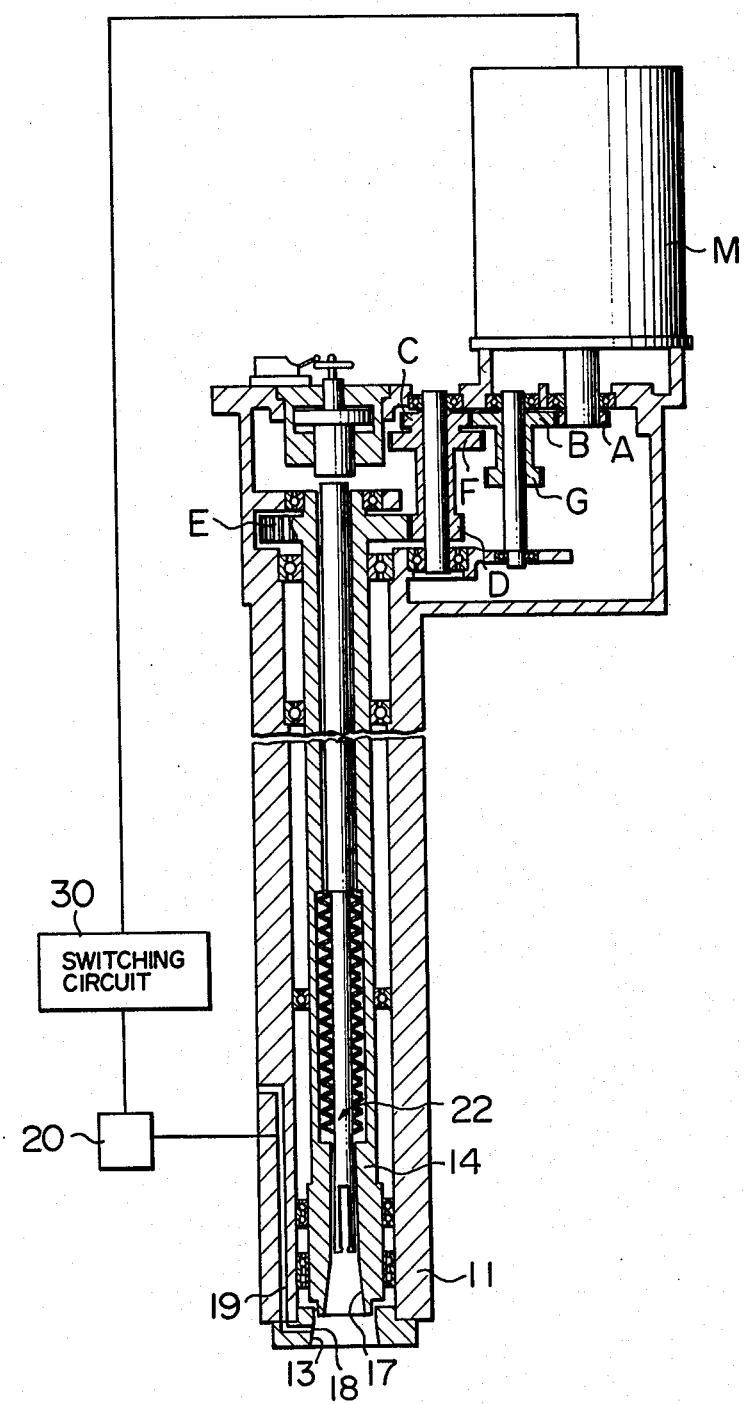
FIG. 3 shows an elevational view of a vertical milling and turning machine of this invention.

FIG. 3 is an elevational view of the vertical milling and turning machine according to this invention, in which the pressure detecting switch 20 is connected to a drive motor M through a switching circuit 30. The driving force of the motor M is transmitted to the spindle 14 through known means including a gear train A-B-C-D-E or A-B-G-F-E, which is selected by a desired revolution numbers of the spindle 14. The drive of the motor M is controlled by the switching circuit 30 described hereunder in conjunction with FIG. 4.

Figure 4:
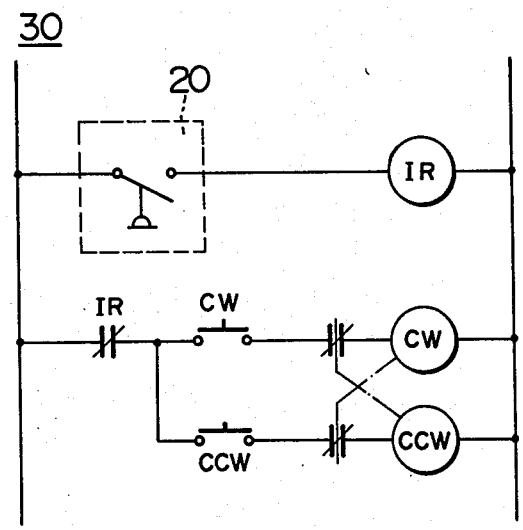
FIG. 4 shows a block diagram of a switching circuit connected to the machine shown in FIG. 3.

FIG. 4 shows a block diagram of the switching circuit 30, in which when the pressure detecting device 20 is "ON" condition, i.e. during the turning operation, relay means IR takes "OFF" condition and push buttons (or contact switches) CW and CCW are not enabled, whereby the motor M, i.e. spindle 14, is not driven clockwisely and counter-clockwisely. In addition, interlock means is arranged in this circuit for securely rotating the spindle 14 clockwisely or counter-clockwisely when one of push buttons is depressed.

The operation and function of the vertical milling and turning machine according to this invention will be described hereunder.

At the milling operation, the milling tool 16 is inserted into the spindle 14 so that the first shank portion 16a of the tool 16 engages the tapered surface of the hole 17 of the spindle 14 and a pull stud 25 of the tool 16 is then pulled upwardly by a draw rod 22 to thereby secure the milling tool 16 to the spindle 14. After a set-pressure of the pressure detecting switch 20 has been preset to a value between an atmospheric pressure and a compressed air pressure of the air supply source, the compressed air is supplied therefrom to the passage 19 and blows out through the opening 18. Under these conditions, the milling tool 16 is rotated by the rotation of the spindle 14, since the compressed air is blown out through the gap 23 between the second shank portion 16b and the tapered inner surface 13 of the front end 11a of the ram 11, dusts and swarves caused by the milling operation cannot intrude into the gap 23. During these operations, the opening 18 is opened to the gap 23 and communicated with the atmosphere, so that the pressure detecting switch 20 indicates a low pressure, i.e. "OFF" condition. Thus, at a grance of the pressure detecting switch 20, it is found that the milling operation is now carried out.

While, at the turning operation, the turning tool 12 is inserted into the spindle 14 so that the second shank portion 12b of the tool 12 engages the tapered surface 13 of the front end 11a of the ram 11. The key member 24 of the tool 12 is engaged with the key groove 21 and a pull stud 25 of the tool 12 is then pulled upwardly by a draw rod 22 to thereby firmly secure the turning tool 12 to the ram 11 of the spindle assembly 10. The present pressure of the pressure detecting switch 20 is set to a value between the atmospheric pressure and the pressure supplied from the pressure source, and the compressed air is then fed into the passage 19 towards the opening 18. Under this condition, when a workpiece, not shown, is rotated to carry out the turning operation, the pressure of the compressed air in the passage 19 increases to a value near the pressure preset by the switch 20 because the opening 18 of the passage 19 is closed by the tapered surface 13 of the shank 12a of the turning tool 12. Then, the pressure detecting switch 20 becomes "ON" state, thus confirming the fact that the turning tool 12 is secured to the ram 11. Under the "ON" state of the switch 20, the motor M is not driven and the spindle is not also rotated.

We claim:

1. In a vertical milling and turning machine provided with a spindle assembly connected to a drive motor, said spindle assembly comprising a hollow ram provided with a tapered opening at the front end thereof for attaching a turning tool and a hollow spindle provided with a tapered opening at the front end thereof for attaching a milling tool, said tapered opening of the spindle being coaxial with said tapered opening of the ram and having a diameter smaller than that of the later opening, the improvement in which an air supply passage is formed in said ram so as to have an end opening opened towards said tapered opening of the ram at the rear portion of the turning tool and switch means for detecting pressure in said passage is connected to said air supply passage, said switch means being connected to said motor through a switching circuit so as to operate said spindle through said motor in accordance with a pressure detected by said pressure detecting switching means.

* * * * *